(12) United States Patent
Al-Rwaily et al.

(10) Patent No.: US 11,609,158 B2
(45) Date of Patent: Mar. 21, 2023

(54) PIPELINE SAMPLING SCRAPER TO SAMPLE HYDROCARBON DEPOSITS WHILE TRAVELING IN PIPELINES

(71) Applicant: Saudi Arabian Oil Company, Dhahran (SA)

(72) Inventors: Nawaf Al-Rwaily, Dammam (SA); Ahmad Akkas, Hufof (SA)

(73) Assignee: SAUDI ARABIAN OIL COMPANY

(*) Notice: Subject to any disclaimer, the term of this patent is extended or adjusted under 35 U.S.C. 154(b) by 414 days.

(21) Appl. No.: 17/017,204

(22) Filed: Sep. 10, 2020

(65) Prior Publication Data

US 2022/0074822 A1 Mar. 10, 2022

(51) Int. Cl.
| | |
|---|---|
| G01N 1/04 | (2006.01) |
| B08B 9/055 | (2006.01) |
| B08B 13/00 | (2006.01) |
| F16L 55/26 | (2006.01) |
| G01N 1/10 | (2006.01) |
| G01N 1/22 | (2006.01) |
| F16L 101/30 | (2006.01) |

(52) U.S. Cl.
CPC ............. *G01N 1/04* (2013.01); *B08B 9/0551* (2013.01); *B08B 13/00* (2013.01); *F16L 55/26* (2013.01); *G01N 1/10* (2013.01); *G01N 1/22* (2013.01); *B08B 2209/055* (2013.01); *F16L 2101/30* (2013.01); *G01N 2001/1031* (2013.01)

(58) Field of Classification Search
CPC ... B08B 13/00; B08B 2209/055; B08B 9/055; B08B 9/0551; F16L 2101/30; F16L 55/26; G01N 1/04; G01N 1/08; G01N 1/10; G01N 1/20; G01N 1/22; G01N 17/04; G01N 2001/1025; G01N 2001/1031; G01N 2001/205
USPC .......................................... 73/863.72
See application file for complete search history.

(56) References Cited

U.S. PATENT DOCUMENTS

| | | |
|---|---|---|
| 3,282,113 A | 11/1966 | Sachnik |
| 3,681,997 A | 8/1972 | Allen |

(Continued)

FOREIGN PATENT DOCUMENTS

| | | |
|---|---|---|
| CA | 2510515 A1 | 7/2004 |
| CN | 207357724 U * | 5/2018 |

(Continued)

OTHER PUBLICATIONS

PCTUS2021049658 International Search Report and Written Opinion dated Jan. 5, 2022, 15 pgs.

*Primary Examiner* — John Fitzgerald
*Assistant Examiner* — Nashmiya S Fayyaz
(74) *Attorney, Agent, or Firm* — Bracewell LLP; Constance Gall Rhebergen

(57) ABSTRACT

Methods and systems are provided for treating the tail gas stream of a sulfur recovery plant. The methods including generating a tail gas stream from a sulfur recovery plant, treating the tail gas stream with a hydrogen sulfide absorption unit and a hydrogen selective membrane unit, generating a stream low in hydrogen sulfide and a stream rich in hydrogen. The hydrogen sulfide rich stream is recycled to the sulfur recovery unit. The hydrogen selective membrane unit includes a glassy polymer membrane selective for hydrogen over hydrogen sulfide and carbon dioxide.

19 Claims, 2 Drawing Sheets

(56) References Cited

U.S. PATENT DOCUMENTS

| | | | |
|---|---|---|---|
| 4,411,039 A | * | 10/1983 | Timmins ............... B08B 9/0558 |
| | | | 134/8 |
| 7,051,587 B2 | | 5/2006 | Simpson et al. |
| 7,363,972 B2 | | 4/2008 | Dybdahl |
| 7,621,325 B2 | | 11/2009 | Shammai et al. |
| 8,713,741 B2 | | 5/2014 | Fjerdingstad |
| 8,770,892 B2 | | 7/2014 | Sweeney et al. |
| 9,188,511 B2 | | 11/2015 | Keatch |
| 2017/0059473 A1 | * | 3/2017 | Kumar ................... G01N 27/06 |
| 2018/0031146 A1 | | 2/2018 | Pinho et al. |
| 2018/0356314 A1 | | 12/2018 | Lagus |
| 2019/0162635 A1 | | 5/2019 | Donald et al. |

FOREIGN PATENT DOCUMENTS

| | | | | |
|---|---|---|---|---|
| GB | 2338307 A | * | 12/1999 | ............. G01N 17/00 |
| WO | 2006054076 A1 | | 5/2006 | |

* cited by examiner

PIPELINE SAMPLING SCRAPER TO SAMPLE HYDROCARBON DEPOSITS WHILE TRAVELING IN PIPELINES

FIELD

This disclosure relates to methods and apparatuses for sampling substances in a pipeline. More specifically, this disclosure relates to collecting samples of material from a pipeline using a sampling system disposed within a pipeline pig.

BACKGROUND

Pipelines require routine maintenance and cleaning. Pipeline operations often require pigging, or using pipeline inspection gauges (pigs) to inspect, clean, or otherwise clear a pipeline. "Dumb" pigs, those without on-board programming or electrical components, operate to scrape and remove debris such as wax, scale, sand, and foreign matter from the pipeline. There are a variety of types of cleaning pigs and scrappers, made of various materials for various functions. "Smart" pigs, which have a variety of mechanisms onboard, can be used to make detailed measurements and inspections of the pipeline, and often are equipped with technologies of varying sophistication that perform specific functions, such as measuring devices to measure the interior surface of the pipeline, magnetic flux leakage or ultrasonic scanning to measure pipeline material integrity, complex tools with probes, and sensors for inspection.

Even with routine maintenance and cleaning, pipelines can suffer from corrosion which can weaken the walls of the pipeline, causing dangerous leaks or failures. Inspecting pipelines for corrosion, however, can be difficult since most pipelines are situated underground. Various methods of inspecting pipelines for corrosion and integrity exist, including sampling for corrosion indicators, using smart pigs that can gauge the physical attributes of the pipeline and the pipeline wall thickness, magnetic field tracking to detect metal loss in the pipeline, using acoustic technology in smart pigs, monitoring for leaks along a pipeline, and hydrostatic testing. Corrosion rates can also be monitored by coupons, probes, corrosion produce sampling, and CP current measurements.

Each of the conventional methods of monitoring for corrosion, however, have drawbacks. Hydrostatic testing requires the pipeline to be removed from service. Running a smart pig in a pipeline is expensive and difficult, potentially taking months to schedule, plan and execute properly. Additionally, due to the large size and clearance requirements of most smart pigs, only certain sizes and profiles of pipelines can be analyzed with smart pigs. Waiting to detect a leak in a pipeline can not only be unsafe, but can lead to catastrophic failures.

Sampling along a pipeline and analyzing the material collected for corrosion indicators can provide a general indication for corrosion. Sampling can provide an effective method in understanding the internal corrosion behavior in pipelines, and can also assist in extrapolating the corrosion rate of the pipeline. Sampling analyses conducted to monitor corrosion include sampling the composition of phases present in the material transported in the pipeline, including determination of the base water and sediment, water cut, corrosion inhibitor residual, $H_2S$, $CO_2$, and presence of bacteria that could indicate microbial induced corrosion. Currently, pipeline sampling is done by obtaining spot samples from specific sampling points along the pipeline. Many spot samples must be taken over time and across pipelines to gather enough data to identify trends. Spot sampling is not representative of the pipeline as a whole, and the location of the corrosion cannot always be pinpointed. Additionally, taking samples manually via conventional methods can create health and safety concerns for individuals since the sampling is performed while the pipeline is in service. Individuals can be exposed to toxic media during sample collection if not properly trained or if a malfunction or leak occurs. Installing sampling points along a pipeline segment can also be cost prohibitive and generate similar health and safety issues.

Conventional methods of monitoring for corrosion such as running smart pigs can be unavailable for certain pipelines, or too costly or difficult to implement. Other options for detecting corrosion can be too inaccurate to pinpoint target areas or are not sensitive enough to detect and pinpoint corrosion before material becomes compromised. Although sampling is considered an effective method in understanding internal corrosion behavior, current sampling methods can be imprecise, costly, dangerous, and unable to provide representative samples from targeted areas of the pipeline. Therefore, methods and apparatuses of obtaining samples from a pipeline to determine corrosion behavior is needed.

SUMMARY

The disclosure relates to an apparatus and method for obtaining a sample from a pipeline to monitor for corrosion. More specifically, the disclosure relates to a pipeline pig with a scraping mechanism and sampling mechanism. The pipeline pig travels down the pipeline. The scraping mechanism removes material from the walls of the pipeline and into a conduit within the pipeline pig. Valves prevent the material from entering a sampling container until a sample is desired to be taken. When the pipeline pig reaches a zone in the pipeline where it is desired to sample material to monitor for corrosion, a controller signals one or more valves to open. Once a sample has been collected, the valves can be closed. When the pipeline pig is removed from the pipeline, the sample can be removed from the sampling container and analyzed for corrosion indicators.

In a first aspect, an apparatus for sampling material in a target zone to identify and monitor pipeline corrosion is disclosed. The apparatus includes a pipeline pig, and the pipeline pig includes a scraping mechanism and a sampling mechanism. The scraping mechanism is positioned at a leading end of the pipeline pig. The scraping mechanism operates to dislodge a material from an inside wall of a pipeline. The sampling mechanism includes a first conduit, a first valve, a sampling cylinder, a second conduit, and a second valve. The sampling cylinder includes a front opening and a distal opening. The first conduit traverses the scraping mechanism, allowing the first conduit to open into the pipeline. The first conduit further extends away from the leading end of the pipeline pig towards a distal end of the pipeline pig. The first conduit is in close proximity to the front opening of the sampling cylinder such that substances can pass between the first conduit and the sampling cylinder. The first valve is situated on the first conduit between the scraping mechanism and the sampling cylinder. The first valve operates to selectively seal the first conduit preventing material from entering the sampling cylinder. The second conduit is in close proximity to the distal opening of the sampling cylinder, so that substances can pass between the sampling cylinder and the second conduit. The second conduit extends away from the scraping mechanism at the leading end of the pipeline pig and towards the distal end of the pipeline pig. The second valve is situated on the second conduit so that a portion of the second conduit extends beyond the second valve towards the distal end of the pipeline pig. The second valve operates to selectively seal the second conduit so that the portion of the second conduit is sealed from the second conduit in close proximity to the sampling cylinder.

In certain aspects, the apparatus includes a controller. The controller is in communication with the first valve so that the controller selectively modifies a first valve operating position. The first valve operating position either seals or unblocks the first conduit. The controller is also in communication with the second valve, so that the controller selectively modifies a second valve operating position. The second valve operating position either seals or unblocks the second conduit.

In an aspect, the apparatus further includes a plurality of wires, and the wires are connected to the controller and the first valve or the second valve, so that the wires allow for the controller to be in communication with the first valve or the second valve. In another aspect, the controller includes a transmitter and receiver capable of modifying the first valve operating position or the second valve operating position.

In certain aspects, the controller includes a device selected from the group including an odometer, a radio wave transmitter, a radio wave receiver, an electronic signal receiver, an electronic signal transmitter, a timer, a geospatial locator, and combinations of the same.

In an aspect, the first valve and the second valve are solenoid valves.

In an aspect, the pipeline pig is equipped with a plurality of the sampling mechanisms so that each of the plurality of the sampling mechanisms collects a sample of the material in one of a plurality of target zones along the pipeline. In certain aspects, the pipeline pig includes a supplementary scraping mechanism at the distal end of the pipeline pig. In certain aspects, the sampling mechanism is removable from the pipeline pig.

In a second aspect, a method of monitoring corrosion from the pipeline with a pipeline tool is disclosed. The method includes the steps of introducing the pipeline pig to the pipeline, so that the pipeline pig travels in a direction of fluid flow in the pipeline. As noted above, the pipeline pig includes the leading end and the distal end. The pipeline has a potential for damage from corrosion along the inside wall of the pipeline. The pipeline pig includes the scraping mechanism and the sampling mechanism. The scraping mechanism is positioned at the leading end of the pipeline pig. The sampling mechanism includes the first conduit, the first valve, the sampling cylinder, the second conduit, and the second valve. The sampling cylinder includes the front opening and the distal opening. The first conduit in the pipeline pig traverses the scraping mechanism so that the first conduit opens into the pipeline. The first conduit extends away from the leading end of the pipeline pig toward the distal end of the pipeline pig. The first conduit is in close proximity to the front opening of the sampling cylinder so that substances can pass between the first conduit and the sampling cylinder. The first valve is situated on the first conduit between the scraping mechanism and the sampling cylinder. The second conduit is in close proximity to the distal opening of the sampling cylinder such that substances can pass between the sampling cylinder and the second conduit. The second conduit extends away from the scraping mechanism at the leading end of the pipeline pig and towards the distal end of the pipeline pig. The second valve is situated on the second conduit so that a portion of the second conduit extends beyond the second valve towards the distal end of the pipeline pig.

The method includes the step of maintaining the first valve in a closed position so that access to the sampling cylinder is blocked. The method also includes the step of scraping the inside wall of the pipeline with the scraping mechanism so that a material is dislodged from the inside wall of the pipeline, and collecting the material from the action of the scraping mechanism so that the material enters the first conduit. The method also includes the step of opening the first valve, which is situated on the first conduit, so that the material passes into the sampling cylinder, and collecting the material as a sample in the sampling cylinder for a preselected period of time. The method then includes closing the first valve such that no additional material enters the sampling cylinder so that the sample is isolated from the pipeline.

In an aspect, the method includes utilizing a pipeline pig with a controller, so that the opening of the first valve is triggered by the controller. In an aspect, the entire method is performed with the second valve is maintained in a closed position. In an aspect, the controller determines a point at which the first valve is opened based on measurements from a device selected from the group including an odometer, a radio signal receiver, a radio signal transmitter, an electronic signal receiver, an electronic signal transmitter, a timer, and combinations of the same.

In an aspect, the method further includes the steps of opening the second valve, allowing the material to move from the sampling cylinder into the second conduit through the second valve, where the second conduit is operable to allow heavier material to travel through the second conduit, and closing the second valve. In an aspect, the method includes utilizing a pipeline pig with a controller, so that the stop of opening the second valve is triggered by the controller. In an aspect, the controller determines a point at which the second valve is opened based on measurements from a device selected from the group including an odometer, a radio signal receiver, a radio signal transmitter, an electronic signal receiver, an electronic signal transmitter, a timer, and combinations of the same.

In an aspect, the method further includes the steps of identifying a target zone in the pipeline, where the target zone is a portion of the pipeline suspected of having possible corrosion or pitting along the inside wall of the pipeline, and collecting the sample from the target zone, so that the controller signals to open the first valve to allow the material to enter the sampling cylinder when the pipeline pig is within the target zone. In an aspect, the material is comprised of matter selected from the group including gas, liquid, solid, sludge, pipeline corrosion indicators, metal oxides, microbes, and combinations of the same.

In an aspect, the method further includes the steps of retrieving the pipeline pig from the pipeline, removing the sample from the sampling cylinder, and analyzing the sample from the sample cylinder to determine corrosion levels in the pipeline where the sample was collected.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and is

Figure 1:
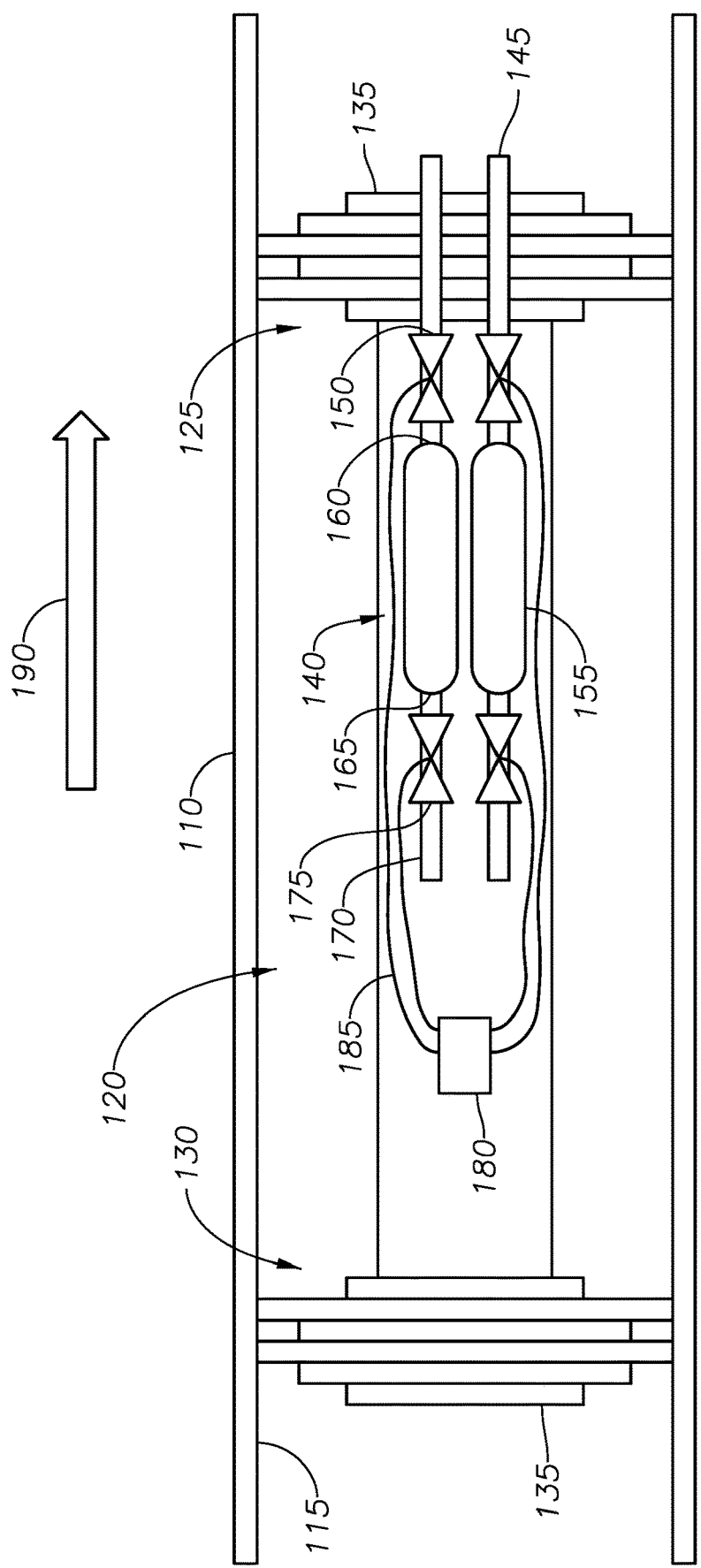
FIG. 1 is a cross section drawing of the pipeline pig with the sampling mechanism, where the pipeline pig includes the plurality of scraping mechanisms, according to an embodiment.

In the accompanying Figures, similar components or features, or both, can have a similar reference label. For the purpose of the simplified schematic illustration and descriptions of FIGS. 1-2, the numerous valves, sensors, electronic controllers, and the like that can be employed and well known to those of ordinary skill in the art are not included. Further, accompanying components that are in conventional industrial applications are not depicted. However, operational components, such as those described in the present disclosure, can be added to the embodiments described in this disclosure.

DETAILED DESCRIPTION

While the disclosure will be described with several embodiments, it is understood that one of ordinary skill in the relevant art will appreciate that many examples, variations and alterations to the apparatuses and methods described are within the scope and spirit of the disclosure. Accordingly, the embodiments of the disclosure described are set forth without any loss of generality, and without imposing limitations, on the claims.

The description may use the phrases "in some embodiments," "in an embodiment," or "in embodiments," which can each refer to one or more of the same or different embodiments. Furthermore, the terms "comprising," "including," "containing," and the like, as used with respect to embodiments of the present disclosure, are synonymous.

As used in this disclosure, the term "about" is utilized to represent the inherent degree of uncertainty that may be attributed to any quantitative comparison, value, measurement, or other representation. The term "about" is also utilized in this disclosure to represent the degree by which a quantitative representation can vary from a stated reference without resulting in a change in the basic function of the subject matter at issue.

As used in this disclosure, the term "in close proximity" refers to objects being near, close to, proximate to, immediately preceding or following, abutting, or touching one another. Objects need not be physically touching to be in close proximity.

In embodiments of the present disclosure, methods and apparatuses used to sample material from pipelines are provided. The apparatuses include the pipeline pig with the scraping mechanism and the sampling mechanism. The scraping mechanism removes or displaces material in close proximity to the inside wall of the pipeline. The sampling mechanism collects samples of the material removed from the pipeline, and can be remote controlled such that the sample is collected at a specific point along the pipeline. The methods include introducing the pipeline pig to the pipeline, allowing the pipeline pig to flow in the direction of fluid flow in the pipeline, scraping material off of the inside wall of the pipeline with the scraping mechanism, collecting the sample via the sampling mechanism by opening the first valve to allow material to enter the sampling cylinder, then closing the first valve to capture the sample.

Advantageously, the embodiments disclosed herein solve many problems. The apparatuses and methods disclosed herein allow sampling to monitor internal corrosion behavior in pipelines and extrapolate corrosion rates without being limited to sampling points installed on the pipeline and without the health and safety hazards associated with sampling points. In traditional manual sampling using conventional methods, the sample is collected by an individual while the pipeline is in service, potentially exposing the individual to chemical or pipeline materials. Additionally, if the sample point is located at or near a weak point on the pipeline, the pipeline can leak. If the individual is not well trained in following the specific procedure in sampling, the individual can be exposed to toxic media. With the disclosed embodiments, however, the sample is secured in the sampling mechanism, so individuals are not exposed to the sample until the sample is in a lab setting, thereby reducing health and safety concerns. There is also a cost associated with establishing standard sampling points along a pipeline segment. The embodiments disclosed herein, however, are cost-effective in that the sampling mechanisms can be used multiple times and no sampling points are required to be established along the pipeline.

The embodiments herein are flexible and can be deployed in any standard cleaning scraper and pipeline. The sampling mechanism and scraping mechanism can be sized to fit any size pipeline pig and pipeline, for any type of pipeline pig and pipeline. Cleaning pigs are designed to go through many pipeline types and sizes, so there is no concern regarding size and access for the pipeline pig disclosed herein, unlike the concerns for size and access needed for a smart pig. Due to the size of the measurement devices and on-board systems, smart pigs are large and cumbersome, requiring a certain diameter and oftentimes limited to a certain pipeline bend for clearance reasons. Additionally, smart pigs are limited in how and where they can be launched and retrieved from due to their size and delicate nature. Cleaning and scraper pigs are much smaller and more durable, and can be launched from any standard pig launching mechanism. Advantageously, the embodiments disclosed herein can be use in any pipelines without concerns for size, sharp bends, or other access issues.

Using the embodiments disclosed herein, the samples can be obtained at certain locations depending on the objective of sampling, the pipeline provide, and any debris located inside the pipeline. The embodiments allow for sampling from specific target zones. The sampling can be representative of the entire target area. Advantageously, multiple samples can be taken, and samples can be isolated from one another so that multiple zones are tested with the same pipeline pig. The dual valve mechanisms and extra second conduit provides additional advantages, as heavier debris and solids can be collected in the second conduit portion when the second valve is open. The design of the sampling mechanism allows for the capturing of a homogenous sample as the first valve and the second valve are opened. The sampling cylinder can be removable so that the sample is easily accessible and so that the sampling cylinder can be reused or replaced. The system can work with rechargeable or replaceable batteries, such as lithium batteries. The system can be triggered by remote, timer programmed, or distance programmed, such that specific areas of the pipeline can be tested. The sampling mechanism can be easily duplicated so that multiple samples can be taken by the same pipeline pig.

Referring now to the figures, FIG. 1 is a diagram of an embodiment of the invention. FIG. 1 is a cross section view of pipeline pig 120 disposed inside of pipeline 110. Pipeline 110 includes the target zone which is suspected of experiencing corrosion. Pipeline 110 has direction of travel 190 which is the direction of the fluid flow propelling pipeline pig 120 in pipeline 110. Pipeline 110 includes inside wall 115, which is in contact with the fluid traveling through the pipeline. Pipeline 110 can be any type of pipeline constructed of any type of material. Pipeline 110 can carry any type of fluid typically carried in pipelines. In some embodiments, pipeline 110 is a natural gas pipeline carrying natural gas, constructed of materials including steel and metal. In another embodiment, pipeline 110 is an oil pipeline carrying hydrocarbons, constructed of materials including steel and metal.

Pipeline pig 120 is a type of pig that is capable of pushing fluids through pipeline 110. Pipeline pig 120 can be a cleaning pig capable of removing debris in the pipeline. Pipeline pig 120 can be a scraping pig capable of scraping inside wall 115 of pipeline 110. Pipeline pig 120 depicted in FIG. 1 is a bi-directional (BI-DI) pig. BI-DI pigs can be used as scrapers or cleaning pigs, and can be run in either direction, so that if direction of travel 190 is reversed, the BI-DI pig can be reversed in pipeline 110. In other embodiments, pipeline pig 120 is a mandrel tool with foam to protect the internal components, and the internal components are bolted inside the mandrel body. A mandrel tool, or a mandrel pig, includes a steel body with a variety of cups, discs, or brushes that can be used for cleaning a pipeline. Pipeline pig 120 can be constructed of a variety of materials, including foam, steel, plastic, rubber, urethane, neoprene, or nitrile. Pipeline pig 120 can be any type of pipeline pig of any size. The size of pipeline pig 120 can correspond to the size of pipeline 110. In some embodiments, the pipeline diameter is 6 inches or greater, alternately 12 inches or greater, alternately 14 inches or greater, alternately 16 inches or greater, alternately 18 inches or greater, or alternately 24 inches or greater. Pipeline pig 120 can be a single pig traveling along in pipeline 110, or can be part of a train of pigs connected or otherwise traveling together in pipeline 110.

Pipeline pig 120 includes leading end 125 and distal end 130. Leading end 125 is the end of pipeline pig 120 that travels down pipeline 110 before distal end 130 in direction of travel 190. Distal end 130 of pipeline pig 120 is opposite of leading end 125. Leading end 125 of pipeline pig 120 can be partially responsible for scraping, cleaning, or pushing fluids, liquids, debris, or other substances or material down pipeline 110.

Pipeline pig 120 includes scraping mechanism 135 disposed at leading end 125 of pipeline pig 120. Scraping mechanism 135 can be disposed near leading end 125 of pipeline pig 120, but not necessarily located at the forwardmost portion of pipeline pig 120 as it travels in direction of travel 190 through pipeline 110. Scraping mechanism 135 can be any type of apparatus or material capable of scraping inside wall 115 of pipeline 110 so that the material adjacent to, adhered to, or in close proximity to inside wall 115 of pipeline 110 is dislodged or displaced from inside wall 115 of pipeline 110. Scraping mechanism 135 can be constructed of any material. Scraping mechanism 135 can include cups, discs, or brushes. Pipeline pig 120 has a supplementary scraping mechanism 135 at distal end 130.

Pipeline pig 120 also includes sampling mechanism 140. Sampling mechanism 140 is disposed inside pipeline pig 120. Sampling mechanism 140 includes first conduit 145, first valve 150, sampling cylinder 155, second conduit 170, and second valve 175. Sampling cylinder 155 includes front opening 160 and distal opening 165.

First conduit 145 extends through scraping mechanism 135, traversing scraping mechanism 135 entirely so that first conduit 145 opens into pipeline 110. First conduit 145 is open to pipeline 110 such that the material from pipeline 110 can enter first conduit 145. First conduit 145 extends past scraping mechanism 135 into pipeline 110. In other embodiments, first conduit 145 is flush with scraping mechanism 135.

First conduit 145 extends from leading end 125 of pipeline pig 120 through pipeline pig 120 towards distal end 130. First conduit 145 can be constructed of any material. First conduit 145 can be constructed of a small diameter pipe. In some embodiments, first conduit 145 is a metal pipe. First conduit 145 can be made of any material resistant to corrosion and compatible with the fluid being sampled. In some embodiments, pipeline 110 carries hydrocarbons, and first conduit 145 is made of stainless steel. In some embodiments, first conduit 145 is a channel in the material of pipeline pig 120, so that first conduit 145 is an open annulus extending through pipeline pig 120. In other embodiments, first conduit 145 is a tunnel formed in the foam of pipeline pig 120. The diameter of first conduit 145 can vary depending on the size of pipeline 110, the size of pipeline pig 120, the size of sampling cylinder 155, the expected consistency of the material being sampled, and other variables. First conduit 145 can be about 0.5 inches in diameter, alternately about 0.75 inches in diameter, alternately about 1 inch in diameter, alternately about 1.25 inches in diameter, alternately about 1.5 inches in diameter, and alternately about 2 inches in diameter.

First conduit 145 extends towards sampling cylinder 155. First conduit 145 can terminate in close proximity to front opening 160 of sampling cylinder 155. First conduit 145 can abut front opening 160 of sampling cylinder 155.

Sampling cylinder 155 is a container capable of holding the material taken as the sample. Sampling cylinder 155 can be a container positioned in pipeline pig 120. In other embodiments, sampling cylinder 155 is a cavity formed in the foam of pipeline pig 120. Sampling cylinder 155 can be constructed of any material. In other embodiments, sampling cylinder 155 is a metal cylinder. Sampling cylinder 155 can be made of any material resistant to corrosion and compatible with the fluid being sampled. In some embodiments, pipeline 110 carries hydrocarbons, and sampling cylinder 155 is made of stainless steel. Sampling cylinder 155 can be any size or shape to fit into pipeline pig 120. In some embodiments where the pipeline pig is 24 inches in diameter, four sampling cylinders are provided in the pipeline pig, each sampling cylinder having a four inch diameter.

Front opening 160 pierces or otherwise fully traverse sampling cylinder 155 walls such that the material can pass from first conduit 145 into sampling cylinder 155. Front opening 160 of sampling cylinder 155 can be any size or shape. Front opening 160 can be an annulus connecting the interior of sampling cylinder 155 to first conduit 145. In some embodiments, sampling cylinder 155 and first conduit 145 are affixed so that front opening 160 is formed where sampling cylinder 155 and first conduit 145 are connected.

First valve 150 is situated on first conduit 145 between scraping mechanism 135 and front opening 160 of sampling cylinder 155. First valve 145 is situated on first conduit 145 closer to sampling cylinder 155 than to scraping mechanism 135. First valve 145 can be situated on first conduit 145 closer to scraping mechanism 135 than to sampling cylinder 155. First valve 150 can be connected to the pipe forming first conduit 145. First conduit 145, first valve 150, front opening 160, and sampling cylinder 155 generate a path through which material can pass.

First valve 150 can be any type of valve, closure, or other device that can seal first conduit 145 to prevent material from continuing to pass through first conduit 145 into sampling cylinder 155 through front opening 160. First valve 150 can be a solenoid valve. First valve 145 can be a gate valve, a butterfly valve, a ball valve, a diaphragm valve, or any other type of valve. First valve 145 is actuated or automated. The action of first valve 145 can be powered by batteries. First valve 145 can be operated with a solenoid actuator. First valve 150 can be operated hydraulically using the pressure in pipeline 110. First valve 150 can be constructed of any material or combination of materials. First valve 150 can include additional parts necessary to make first valve 150 operable to seal first conduit 145 so that material cannot pass through first valve 150 into sampling cylinder 155.

The passage of the material through first conduit 145 to front opening 160 is stopped or controlled by modifying first valve operating position. First valve operating position can be fully closed, completely sealing first conduit 145, or not fully closed, where material can pass through first valve 150 continuing through first conduit 145 to sampling cylinder 155. In other embodiments, the first valve operating position can be closed, sealing first conduit 145, or open, where material can pass through first valve 150 continuing through first conduit 145 to sampling cylinder 155. First valve operating position can vary based on the second valve operating position and the sampling desired.

Sampling cylinder 155 also includes distal opening 165. Distal opening 165 is positioned on the opposite end of sampling cylinder 155 from front opening 160. In other embodiments, distal opening 165 is positioned anywhere on sampling cylinder 155. Distal opening 165 of sampling cylinder 155 can be any size or shape. Distal opening 165 pierces or otherwise fully penetrates sampling cylinder 155 walls such that material can pass from sampling cylinder 155 into second conduit 170. Distal opening 165 is an annulus connecting the interior of sampling cylinder 155 to second conduit 170. In other embodiments, sampling cylinder 155 and second conduit 170 are affixed so that distal opening 165 is formed where sampling cylinder 155 and second conduit 170 are connected.

Second conduit 170 extends from distal opening 165 of sampling cylinder 155 through pipeline pig 120 towards distal end 130 of pipeline pig 120. Second conduit 170 is in close proximity to distal opening 165 of sampling cylinder 155. In some embodiments, second conduit 170 abuts distal opening 165 of sampling cylinder 155. Second conduit 170 can be constructed of any material. Second conduit 170 can be constructed of a small diameter pipe. In some embodiments, second conduit 170 is a metal pipe. Second conduit 170 can be made of any material resistant to corrosion and compatible with the fluid being sampled. In some embodiments, pipeline 110 carries hydrocarbons, and second conduit 170 is made of stainless steel. In other embodiments, second conduit 170 is a channel in the material in pipeline pig 120, so that second conduit 170 is an open annulus extending through pipeline pig 120. In other embodiments, second conduit 170 is a tunnel formed in the foam of pipeline pig 120. The diameter of second conduit 170 can vary depending on the size of pipeline 110, the size of pipeline pig 120, the size of sampling cylinder 155, the expected consistency of the material being sampled, and other variables. Second conduit 170 can be the same or a different size than first conduit 145. Second conduit 170 can be about 0.5 inches in diameter, alternately about 0.75 inches in diameter, alternately about 1 inch in diameter, alternately about 1.25 inches in diameter, alternately about 1.5 inches in diameter, and alternately about 2 inches in diameter.

Second valve 175 is situated on second conduit 170 between distal opening 165 of sampling cylinder 155 and the portion of second conduit 170 that extends beyond second valve 175. Second valve 175 can be connected to the pipe forming second conduit 170. Sampling cylinder 155, distal opening 165, second conduit 170 and second valve 175 generate a path through which material can pass.

Second valve 175 can be any type of valve, closure, or other device that can seal second conduit 170 to prevent material from continuing to pass through second conduit 170 into the portion of second conduit 170 extending beyond second valve 175. Second valve 175 can be a solenoid valve. Second valve 175 can be a gate valve, a butterfly valve, a ball valve, a diaphragm valve, or any other type of valve. Second valve 175 is actuated or automated. The action of second valve 175 can be powered by batteries. Second valve 170 can be operated with a solenoid actuator. Second valve 175 can be operated hydraulically using the pressure in pipeline 110. Second valve 175 can be constructed of any material or combination of materials. Second valve 175 can include additional parts necessary to make second valve 175 operable to seal second conduit 170 so that material cannot pass through second valve 175 to the portion of second conduit 170 extending past second valve 175.

The passage of the material is stopped or controlled by modifying the second valve operating position. The second valve operating position is either fully closed, completely sealing second conduit 170, or not fully closed, where material can pass through second valve 175 and continue through second conduit 170. In some embodiments, the second valve operating position includes a partially open valve position. The second valve operating position can be closed, sealing second conduit 170, or open, where material can pass through second valve 175.

The first and second valve operating positions can vary depending on the type of sample desired. In some embodiments, first valve 150 and second valve 175 are both in a not fully closed or an open position, and the sample collected is a fluid sample. In some embodiments, second valve 175 is closed, and first valve 150 is open, which allows for a solids or heavy deposit sample. In some embodiments, second valve 175 is partially open and first valve 150 is fully open, so that the sample becomes mixed and collects solids, debris, fluids, and corrosion products.

Second conduit 170 extends past second valve 175, so that the portion of second conduit 170 extending beyond second valve 175 can be isolated from sampling cylinder 155. Second conduit 170 provides benefits relating to the types of samples taken and the mixing of samples.

Pipeline pig 120 includes more than one of sampling mechanisms 140 so that more than one sample can be taken from various target zones or areas in pipeline 110 while maintaining sampling isolation. Providing more than one sampling mechanisms 140 also allows for the targeted sampling and sampling adjustments for pipeline environment changes, such as changes in elevation. For example, pipeline elevation changes results in heavier materials in the lowest pipeline elevations and pipeline concaves, and lighter material at the highest pipeline elevations. By triggering sampling at these points and providing more than one sampling mechanism 140, targeted sampling and more representative samples can be achieved. In other embodiments, pipeline pig 120 includes only one sampling mechanism 140.

Pipeline pig 120 also includes controller 180. Controller 180 controls when and if first valve 150, second valve 175, or both first valve 150 and second valve 175 open and close, allowing the material access to sampling cylinder 155 or second conduit 170. Controller 180 selectively modifies the first valve operating position or the second valve operating position, and therefore selectively controls the sealing or unblocking of first conduit 145 and second conduit 170 by first valve 150 and second valve 175, respectively. Controller 180 can be any type of technology in communication with first valve 150, second valve 175, or both first valve 150 and second valve 175. Controller 180 can be constructed of any material or group of materials. Controller 180 can be the odometer, the radio wave transmitter, the radio wave receiver, the electronic signal receiver, the electronic signal transmitter, the timer, the geospatial locator, or combinations of the same. In some embodiments, controller 180 is the odometer, and triggers the opening or closing of first valve 150 or second valve 175 based on the distance pipeline pig 120 has traveled in pipeline 110. In some embodiments, controller 180 is the timer, and triggers the opening or closing of first valve 150 or second valve 175 based on the amount of time that has passed. In some embodiments, controller 180 is the radio wave receiver, which receives a signal from a specific point above pipeline 110 which provides a radio wave signal received by controller 180 to open or close first valve 150 or second valve 175. In some embodiments, controller 180 is the electronic signal receiver, which receives a signal from a specific point above pipeline 110 which provides an electronic signal received by controller 180 to open or close first valve 150 or second valve 175.

Controller 180 is connected to wires 185. Wires 185 are connected to both first valve 150 and second valve 175. Controller 180 is in communication with both first valve 150 and second valve 175 by wires 185. Controller 180 can be in communication with first valve 150, second valve 175, or both first valve 150 and second valve 175 by any means. In some embodiments, controller 180 is wireless and sends and receives signals to first valve 150, second valve 175, or both first valve 150 and second valve 175 without a physical connection. Controller 180 allows pipeline pig 120 to sample material from the target zone in pipeline 110 by signaling when first valve 150 and second valve 175 change operating positions.

Controller 180, first valve 150, or second valve 175 can be battery operated. Controller 180, first valve 150, or second valve 175 can be powered by lithium batteries. The actuation of first valve 150 and second valve 175 can be hydraulically powered from pipeline pressure.

In an embodiment, the invention disclosed herein also includes the method of monitoring corrosion from pipeline 110 with pipeline pig 120. Pipeline 110 can be any type of pipeline capable of experiencing some type or corrosion or deterioration. Corrosion can include the gradual destruction, deterioration, or degradation of the constituents of which pipeline 110 is constructed. Although corrosion is used often to refer to the oxidation of metals, many types of material including polymers can experience corrosion. Corrosion behavior in pipelines can be monitored by taking samples from the pipeline. The method disclosed herein can include the acquisition of a representative sample of material adjacent to, adhered to, or in close proximity to inside wall 115 of pipeline 110 to test for corrosion indicators. The method can further include extrapolating a corrosion rate from the sample. In an embodiment, the method involves identifying the target zone in pipeline 110. The target zone in pipeline 110 can be a section of pipeline 110 that includes an area suspected of having corrosion or pitting along inside wall 115 of pipeline 110. In an embodiment, the method includes sampling from the target zone of pipeline 110 which is suspected of suffering from corrosion.

Pipeline pig 120 is introduced to pipeline 110, so that pipeline pig 120 travels in direction of travel 190 of the fluid flow in pipeline 110. Direction of travel 190 in pipeline 110 does not need to be the typical or operational direction that the fluids flows in pipeline 110; direction of travel 190 needs only be the flow of the fluid propelling pipeline pig 120 through pipeline 110. Pipeline 110 can be operated at any pressure. In some embodiments, pipeline 110 has a pressure of 1000 psig, and pipeline pig 120 travels through pipeline 110 at a speed of 1 m/s.

As pipeline pig 120 travels down pipeline 110, scraping mechanism 135 scrapes along inside wall 115 of pipeline 110. The material adjacent to, adhered to, or in close proximity to inside wall 115 of pipeline 110 is dislodged or otherwise displaced from inside wall 115 of pipeline 110. The material can include gas, liquid, solids, sludge, debris, or any combination of the same. The material can carry and include pipeline corrosion indicators, metal oxides, microbes, and other chemical compounds. The material can be in any phase.

The material removed from inside wall 115 of pipeline 110 collects on or near scraping mechanism 135, and enters first conduit 145. The material can be blocked from proceeding through the entirety of first conduit 145 due to first valve 150 being maintained in a closed position, so that first conduit 145 is blocked. First valve 150 is maintained in a closed position until pipeline pig 120 enters the target zone, or a specific point in the pipeline. Once pipeline pig 120 enters the target zone, or specific point in the pipeline, first valve 150 opens to allow material through the rest of first conduit 145 and to sampling cylinder 155. In some embodiments, pipeline pig 120 enters and travels through pipeline 110 with first valve 150 maintained in an open position, so that material can enter sampling cylinder 155 through first conduit 145 during the beginning of the run of pipeline pig 120.

First valve 150 is signaled to open by controller 180 which is in communication with first valve 150. Controller 180 can signal first valve 150 to open when pipeline pig 120 enters the target zone, or reaches a specific point in pipeline 110. Controller 180 can signal first valve 150 to close when pipeline pig 120 leaves the target zone, or reaches a specific point in pipeline 110. In some embodiments, controller 180 is the odometer, which measures the distance pipeline pig 120 travels down pipeline 110 and signals first valve 150 to open or close based on the distance traveled by pipeline pig 120 as compared to the relative distances of the start and stop of the target zone. In some embodiments, controller 180 is the radio signal receiver, which receives a radio signal from a radio signal transmitter on the surface above or near pipeline 110, so that controller 180 opens or closes first valve 150 based on the receiving of the radio signal. In some embodiments, controller 180 includes the timer, and signals to open or close first valve 150 after a certain period of time has passed. Controller 180 signals to open first valve 150 to allow the material to enter sampling cylinder 155 when pipeline pig 120 is within the target zone, so that the sample is collected from the target zone.

As first valve 150 is open, the material from inside wall 115 of pipeline 110 enters sampling cylinder 155 through front opening 160. The material is collected as the sample inside sampling cylinder 155 for the amount of time first valve 150 is opened. The material collected as the sample can include gases, liquids, solids, sludges, and hydrocarbon compounds, and can also include pipeline corrosion indicators, metal oxides, and microbes, as well as other matter that can be inside of pipeline 110. The sample can include all phases present in pipeline 110. The amount of time first valve 150 is opened can be the preselected period of time based on the speed of pipeline pig 120, the target zone of pipeline 110, the amount of pipeline 110 desired to be sampled, the signal from controller 180 to close first valve 150, or any other basis for selecting a period of time. The preselected period of time does not need to be a set period of time, but is regarded as the period of time that first valve 150 is open. The preselected period of time is the amount of time first valve 150 is open before it is signaled to close by controller 180.

First valve 150 is closed after the preselected period of time, such as when controller 180 signals first valve 150 to close. As first valve 150 is closed, first conduit 145 is sealed and no additional material is collected as a sample in sampling cylinder 155.

In some embodiments, the method to collect the sample using pipeline pig 120 is performed with second valve 175 closed for the entirety of the method, so that second conduit 170 is sealed and no material can pass second valve 175 to enter the portion of second conduit 170 extending past second valve 175. In other embodiments, second valve 175 is opened at the beginning of the method, or at another point during the method. In some embodiments, second valve 175 is opened at a specific point in pipeline 110. As second valve 175 is opened, the material flows from sampling cylinder 155 into second conduit 170 through second valve 175 to the portion of second conduit 170 extending beyond second valve 175. The first and second valve operating positions can vary depending on the type of sample desired. In some embodiments, first valve 150 and second valve 175 are both in a not fully closed or an open position, and the sample collected is a fluid sample. In some embodiments, second valve 175 is closed, and first valve 150 is open, which allows for a solids or heavy deposit sample. In some embodiments, second valve 175 is partially open and first valve 150 is fully open, so that the sample becomes mixed and collects solids, debris, fluids, and corrosion products.

The opening of second valve 175 is triggered by controller 180. The method to change second valve operating position can include the same as disclosed herein. Controller 180 and method of opening second valve 175 be the same or different as controller 180 and the method of opening first valve 150.

In some embodiments, more than one of sampling mechanisms 140 is included inside pipeline pig 120 so that the method can be repeated in various target zones of pipeline 110. Providing more than one sampling mechanisms 140 also allows for the targeted sampling and sampling adjustments for pipeline environment changes, such as changes in elevation. For example, pipeline elevation changes results in heavier materials in the lowest pipeline elevations and pipeline concaves, and lighter material at the highest pipeline elevations. By triggering sampling at these points and providing more than one sampling mechanism 140, targeted sampling and more representative samples can be achieved.

Pipeline pig 120 is retrieved from pipeline 110. Once retrieved, the sample is removed from sampling cylinder 155. The sample is tested or analyzed to determine corrosion levels in pipeline 110 where the sample was collected, for example, within the target zone. The analysis can include testing for pipeline corrosion indicators such as specific microbial life or metal oxides. Other analysis can include the composition of all phases present in pipeline 110, base water and sediment, water cut, corrosion inhibitor residual, $H_2S$, and $CO_2$. Sample analysis can assist in understanding the internal corrosion behavior of pipeline 110 and from the sample analysis corrosion rates can be extrapolated by methods known in the art. Trending of sampling data over time or over target zones in the pipeline can assist in the analysis and monitoring for corrosion.

In some embodiments, sampling mechanism 140 is removable from pipeline pig 120. In some embodiments, sampling cylinder 155 is removable from pipeline pig 120.

Figure 2:
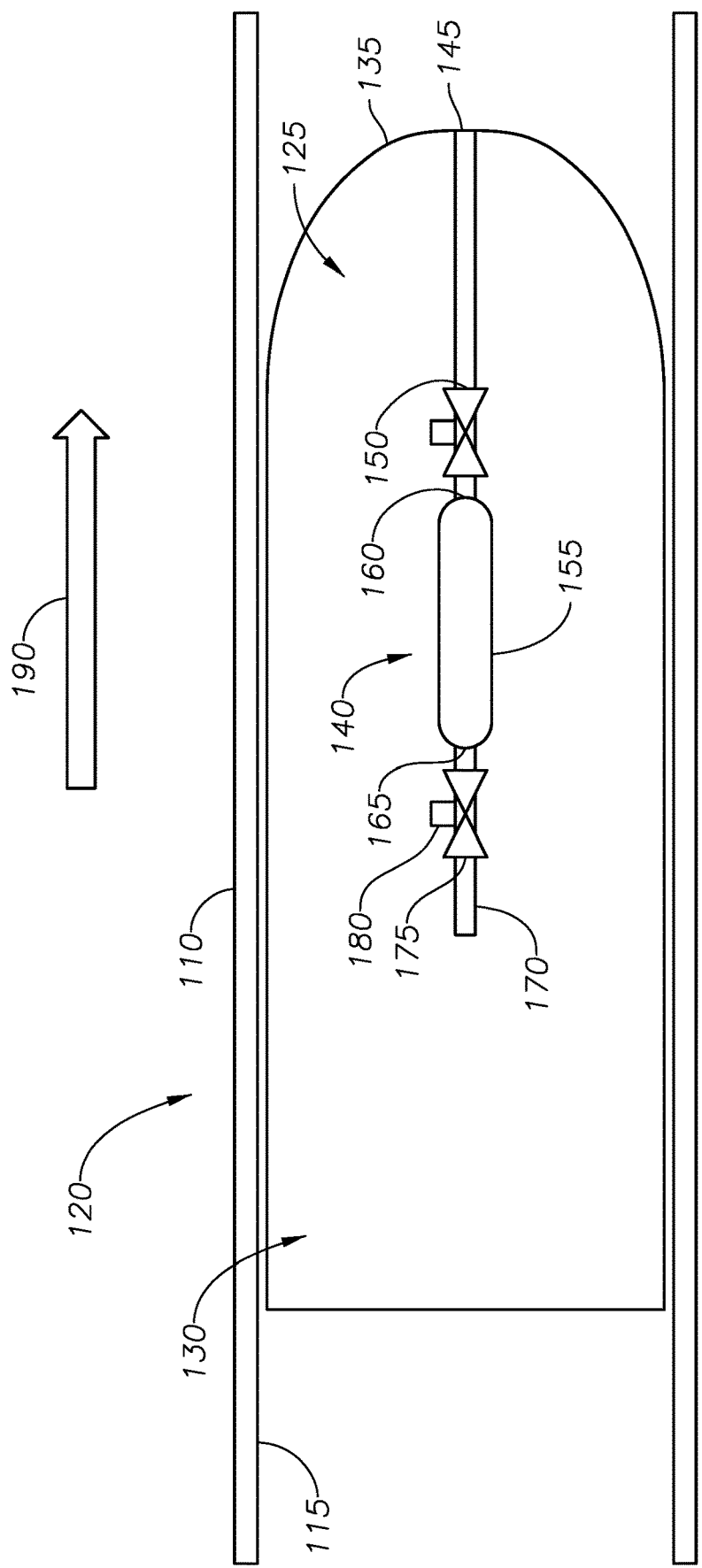
FIG. 2 is a cross section drawing of the pipeline pig with the sampling mechanism, wherein the pipeline pig body is the scraping mechanism, according to an embodiment.

Returning now to the figures, FIG. 2 is a cross section view of pipeline pig 120 disposed inside of pipeline 110 according to an embodiment. All similarly labeled elements can have the same composition, characteristics, and parameters previously disclosed herein. Pipeline pig 120 is a foam pig, with sampling mechanism 140 disposed inside of the body of pipeline pig 120. Pipeline pig 120 includes leading end 125 and distal end 130. Pipeline pig 120 includes scraping mechanism 135 and sampling mechanism 140. Scraping mechanism 135 is the body of pipeline pig 120 that is adjacent to inside wall 115 of pipeline 110 and acts to remove or dislodge a portion of the material adjacent to, adhered to, or in close proximity to inside wall 115 of pipeline 110. Scraping mechanism 135 extends the entire length of the body of pipeline pig 120.

Sampling mechanism 140 is disposed inside the body of pipeline pig 120. Sampling mechanism 140 includes first conduit 145, first valve 150, sampling cylinder 155, second conduit 170, and second valve 175. Sampling cylinder 155 includes front opening 160 and distal opening 165. The opening to first conduit 145 is flush with scraping mechanism 135. First valve 150 is in close proximity to front opening 160. Second valve 175 is in close proximity to distal opening 165. First valve 150 and second valve 175 can operate in the same manner as disclosed above. First valve 150 and second valve 175 can be controlled by controller 180. Controller 180 is integrated with first valve 150 and second valve 175.

Pipeline pig 120 as depicted in FIG. 2 can be used in the methods as disclosed above.

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

What is claimed is:

1. An apparatus for sampling material in a target zone to identify and monitor pipeline corrosion, the apparatus comprising:
   a pipeline pig comprising a scraping mechanism and a sampling mechanism;
   the scraping mechanism positioned at a leading end of the pipeline pig, the scraping mechanism operable to dislodge a material from an inside wall of a pipeline;
   the sampling mechanism comprising a first conduit, a first valve, a sampling cylinder, a second conduit, and a second valve;

the sampling cylinder comprising a front opening and a distal opening;

the first conduit traversing the scraping mechanism such that the first conduit opens into the pipeline, the first conduit further extending away from the leading end of the pipeline pig toward a distal end of the pipeline pig;

the first conduit in close proximity to the front opening of the sampling cylinder such that substances can pass between the first conduit and the sampling cylinder;

the first valve situated on the first conduit between the scraping mechanism and the sampling cylinder, the first valve operable to selectively seal the first conduit preventing the material from entering the sampling cylinder;

the second conduit in close proximity to the distal opening of the sampling cylinder, such that substances can pass between the sampling cylinder and the second conduit, the second conduit extending away from the scraping mechanism at the leading end of the pipeline pig and towards the distal end of the pipeline pig; and the second valve situated on the second conduit such that a portion of the second conduit extends beyond the second valve towards the distal end of the pipeline pig, the second valve operable to selectively seal the second conduit such that the portion of the second conduit is sealed from the second conduit in close proximity to the sampling cylinder.

2. The apparatus of claim 1, further comprising a controller, the controller being in communication with the first valve, such that the controller selectively modifies a first valve operating position, wherein the first valve operating position either seals or unblocks the first conduit, the controller further being in communication with the second valve, such that the controller selectively modifies a second valve operating position, wherein the second valve operating position either seals or unblocks the second conduit.

3. The apparatus of claim 2, wherein the apparatus further comprises a plurality of wires, the wires connected to the controller and the first valve or the second valve, such that the wires allow for the controller to be in communication with the first valve or the second valve.

4. The apparatus of claim 2, wherein the controller comprises a transmitter and receiver capable of modifying the first valve operating position or the second valve operating position.

5. The apparatus of claim 2, wherein the controller comprises a device selected from the group consisting of: an odometer, a radio wave transmitter, a radio wave receiver, an electronic signal receiver, an electronic signal transmitter, a timer, a geospatial locator, and combinations of the same.

6. The apparatus of claim 1, wherein the first valve and the second valve are solenoid valves.

7. The apparatus of claim 1, wherein the pipeline pig is equipped with a plurality of the sampling mechanisms such that each of the plurality of the sampling mechanisms collects a sample of the material in one of a plurality of target zones along the pipeline.

8. The apparatus of claim 1, wherein the pipeline pig comprises a supplementary scraping mechanism at the distal end of the pipeline pig.

9. The apparatus of claim 1, wherein the sampling mechanism is removable from the pipeline pig.

10. A method of monitoring corrosion from a pipeline with a pipeline tool, the method comprising the steps of:

introducing a pipeline pig to the pipeline such that the pipeline pig travels in a direction of fluid flow in the pipeline, wherein the pipeline pig has a leading end and a distal end, and wherein the pipeline has a potential for damage from corrosion along an inside wall of the pipeline;

wherein the pipeline pig comprises a scraping mechanism and a sampling mechanism;

wherein the scraping mechanism is positioned at the leading end of the pipeline pig;

wherein the sampling mechanism comprises a first conduit, a first valve, a sampling cylinder, a second conduit, and a second valve;

wherein the sampling cylinder has a front opening and a distal opening;

wherein the first conduit traverses the scraping mechanism such that the first conduit opens into the pipeline, the first conduit further extending away from the leading end of the pipeline pig toward the distal end of the pipeline pig;

wherein the first conduit is in close proximity to the front opening of the sampling cylinder such that substances can pass between the first conduit and the sampling cylinder;

wherein the first valve is situated on the first conduit between the scraping mechanism and the sampling cylinder;

wherein the second conduit is in close proximity to the distal opening of the sampling cylinder such that substances can pass between the sampling cylinder and the second conduit, the second conduit extending away from the scraping mechanism at the leading end of the pipeline pig and towards the distal end of the pipeline pig;

wherein the second valve is situated on the second conduit such that a portion of the second conduit extends beyond the second valve toward the distal end of the pipeline pig;

maintaining the first valve in a closed position such that access to the sampling cylinder is blocked;

scraping the inside wall of the pipeline with the scraping mechanism such that a material is dislodged from the inside wall of the pipeline;

collecting the material from the action of the scraping mechanism such that the material enters the first conduit;

opening the first valve situated on the first conduit, such that the material passes into the sampling cylinder;

collecting the material as a sample in the sampling cylinder for a preselected period of time; and then closing the first valve such that no additional material enters the sampling cylinder, such that the sample is isolated from the pipeline.

11. The method of claim 10, wherein the pipeline pig further comprises a controller, and further wherein the step of opening the first valve is triggered by the controller.

12. The method of claim 10, wherein the second valve is maintained in a closed position for the entirety of the method.

13. The method of claim 11, wherein the controller determines a point at which to trigger the opening of the first valve based on measurements from a device selected from the group consisting of: an odometer, a radio signal receiver, a radio signal transmitter, an electronic signal receiver, an electronic signal transmitter, a timer, and combinations of the same.

14. The method of claim 10, further comprising the steps of:

opening the second valve;

allowing the material to move from the sampling cylinder into the second conduit through the second valve, the second conduit operable to allow heavier material to travel through the second conduit; and then closing the second valve.

15. The method of claim 14, wherein the pipeline pig further comprises a controller, and further wherein the step of opening the second valve is triggered by the controller.

16. The method of claim 15, wherein the controller determines the point at which to trigger the opening of the second valve based on measurements from a device selected from the group consisting of: an odometer, a radio signal receiver, a radio signal transmitter, an electronic signal receiver, an electronic signal transmitter, a timer, and combinations of the same.

17. The method according to claim 13, further comprising the steps of:

identifying a target zone in the pipeline, wherein the target zone is a portion of the pipeline, and further wherein the target zone is suspected of having possible corrosion or pitting along the inside wall of the pipeline; and collecting the sample from the target zone, such that the controller signals to open the first valve to allow the material to enter the sampling cylinder when the pipeline pig is within the target zone.

18. The method according to claim 10, wherein the material is comprised of matter selected from the group consisting of: gas, liquid, solid, sludge, pipeline corrosion indicators, metal oxides, microbes, and combinations of the same.

19. The method according to claim 10, further comprising the steps of:

retrieving the pipeline pig from the pipeline;

removing the sample from the sampling cylinder; and analyzing the sample from the sampling cylinder to determine corrosion levels in the pipeline where the sample was collected.

* * * * *